United States Patent [19]
Erlandson et al.

[11] Patent Number: 5,172,292
[45] Date of Patent: Dec. 15, 1992

[54] APPARATUS FOR PROTECTING ELECTRONIC EQUIPMENT POWERED FROM A MARINE POWER SOURCE

[75] Inventors: John V. Erlandson, Huntington Beach; John R. Johnson, Laguna Beach, both of Calif.

[73] Assignee: ROI Development Corp. dba NEWMAR, Santa Ana, Calif.

[21] Appl. No.: 467,057

[22] Filed: Jan. 18, 1990

[51] Int. Cl.$^5$ ............... H02J 9/00; H01H 5/20; H02H 1/04

[52] U.S. Cl. ............... 361/92; 361/90; 361/111; 361/118; 307/64

[58] Field of Search ............... 361/56, 91, 111, 90, 361/92, 118; 307/64, 66; 340/663

[56] References Cited

PUBLICATIONS

"Practical Sailor", May 15, 1989, p. 3.
"Newmar" literature on Transient Surge Protector.
"Spike-Tector"-2 pages undated prior art.
"Newmar" literature on Electronic Filters-1 page undated prior art.
"Newmar" Noise Filter Application Notes discussing various types of noise filters, undated-24 pages.

*Primary Examiner*—Steven L. Stephan
*Assistant Examiner*—D. R. Haszko
*Attorney, Agent, or Firm*—Edward J. DaRin

[57] ABSTRACT

A device and method for protecting D.C. powered electronic equipment to be isolated from a D.C. marine power source for minimizing the interference of extraneous signals on the power signals along with a back-up D.C. power source for powering the electronic equipment in the event of the loss of operative power signals from the D.C. source. The device may include a remote indicator for signalling the marine vessel operator that the electronic equipment is being powered from the back-up power source and not the main power source.

7 Claims, 2 Drawing Sheets

APPARATUS FOR PROTECTING ELECTRONIC EQUIPMENT POWERED FROM A MARINE POWER SOURCE

FIELD OF INVENTION

This invention relates to methods and apparatus for protecting electronic equipment powered from a marine power source and, more particularly, to methods and apparatus for protecting marine electronic equipment powered from a D.C. marine power source having noise signals thereon and subject to power interruptions and/or a complete loss of power for powering marine electronic devices and signalling the operative status of the power source.

BACKGROUND OF INVENTION

Marine vessels or ships are usually equipped with D.C. power generators for powering the various electrical and/or electronic devices aboard the vessel from a D.C. power bus. It is characteristic of such marine D.C. power sources that they include voltage spikes superimposed on the power lines, as well as radio frequency (R.F.) noise, or abrupt input voltage drops along with momentary losses of power and complete losses of power. A drop in input voltage to a powered device is typically caused by engine cranking. The present day vessels generally have sophisticated electronic equipment on board, such as navigation electronics or the like. These days the navigation electronic equipment may be LORAN navigation receivers or satellite navigation receivers. Other sensitive electronic shipboard equipment may be video plotters and GPS equipment. These shipboard electronic devices, when powered from a source of D.C. that includes the aforementioned electronics signals or noise thereon are considered "unclean" D.C. power and will cause improper operation or malfunction of the electronic devices to which they are coupled. For example, the navigation electronic equipment is very sensitive to input voltage spikes, surges in power, brownouts (lower input voltages), abrupt voltage changes and electronic noise interference, which is common to the marine power sources. When navigation equipment is powered from such a marine power source, these varying power conditions may cause memory loss, inaccurate output navigation data, component failure, or general malfunction of or damage to the navigation equipment. Accordingly, such sensitive marine electronic devices require a "clean" or "pure" source of power without the aforementioned common irregularities on the power lines for proper operation. In the event of a momentary drop in voltage or loss of power from the D.C. source, the vessel operator may not be aware of the interruption of the operation of his onboard electronic equipment. Accordingly, there is a present need for protective circuits for marine electronic equipment that is powered from such marine D.C. power sources that eliminates the above-mentioned "impurities" from the D.C. power applied thereto and also provides a back-up or standby power source to power the electronic equipment in the event of power loss and/or drop of voltage level from the power source. In addition, some signalling means is desired to make the vessel operator aware of the fact that he has lost power to his electronic devices and the electronics are operating on the basis of a back-up power source for permitting him to take corrective action by either restoring the power to the electronic equipment or turning off the electronic devices before the complete loss of power to the equipment causes a problem, i.e., the voltage from the back-up source drops or is minimal for proper operation.

SUMMARY OF INVENTION

The present invention provides an improved method and apparatus for protecting marine electronic equipment powered from a marine D.C. power source or the main power source on the marine vessel, and signalling means for signalling the marine vessel operator of the loss of power from the marine power source, preferably signalling the operator at a location remote from the location of the marine electronic equipment aboard the vessel. In one aspect of the invention, the method and apparatus of the present invention provides protection for electronic equipment or devices powered from the D.C. marine power source by eliminating the application of the "impurities" in the power signals prior to application or coupling the D.C. power to the electronic equipment. The protection circuit is specifically constructed in the form of electrical filters for substantially eliminating the voltage or power spikes from the power source, power surges, brownouts due to reduced output voltage from the source, and abrupt voltage changes, as well as radio frequency interfering noise, which would render the electronic equipment inoperative or cause it to malfunction. Another aspect of the present invention is the provision of a back-up or standby D.C. power source for the powered electronic equipment that is rendered operative in the event of the complete loss of power from the marine power source or the drop in voltage from the marine power source that would cause the electronic equipment to malfunction. The protective circuits for "cleaning" the D.C. power signals and back-up or standby power source can be housed within a single compact package for ready application to a marine vessel. The protective methods and apparatus of the present invention may also include a compact power status indicator for signalling the marine vessel operator of the status of the marine power source at a point remote from the location of the protected electronic equipment for enabling the vessel's operator to take the necessary corrective action for properly restoring the marine power source. The status indicator is preferably arranged at a location remote to the marine electronic equipment so as to be readily noticeable and visible to the marine operator. The status indicator may include signals for indicating the operability of the power input and output from the protective circuits and signalling the loss of power from the marine power source. When the status indicator is used with the aforementioned protective package, the signalling means may signal by means of a light signal the operative status of the power going into and out of the protective circuitry and a signal indicating that the electronic equipment is operating from the standby power source by means of a blinking light signal.

From the broad method standpoint of the present invention, the method comprehends a method of protecting marine electronic devices powered from a marine D.C. power source, including the steps of arranging an electronic protective device between the marine power source and the marine electronic device to be powered from the power source through the protective device. The protective device is constructed and defined as functioning to eliminate voltage spikes or electrical transients or similar radio frequency noise interference signals received with the marine power source signals for providing a "pure" D.C. signal to the marine electronics and then arranging a back-up D.C. power source between the protective device and the marine electronic device for temporarily powering the marine electronic device therefrom in the event of a drop in output voltage or power interruption of the D.C. power source. The method may also comprehend signalling the marine vessel operator that the marine electronic device has lost its power from the marine power source and is being powered from the back-up power source. The signalling may include a flashing light for signalling the vessel operator that the marine electronic device is being powered from the back-up battery source as a result of loss of power from the marine power source.

From the broad apparatus standpoint, the present invention comprehends a protection circuit for a direct current powered marine navigation electronic equipment adapted to be coupled between a marine D.C. power source and the input terminals of the navigation equipment for providing a "pure" D.C. power thereto. The protection circuit includes circuit means adapted to be coupled to the D.C. power source having filtering circuit means adapted for substantially eliminating voltage spikes, power surges, and noise signals developed on the D.C. power signals for coupling "clean" D.C. signals to said navigation equipment from the output thereof and back-up D.C. power circuit means coupled to the output of the protective circuit means and adapted to be coupled to the navigation equipment for powering the equipment in the event of voltage drops from the marine D.C. source or momentary losses of D.C. power. The protective circuit, when packaged as described, may include a status signalling means for signalling the operability of the D.C. power source and the back-up circuit means for indicating the operative status of the D.C. power source for powering the navigation equipment or the loss of D.C. power to said navigation equipment and the fact that the equipment is being powered from the back-up power source. The status indicator is preferably arranged in a location remote from the protected electronic equipment for ready viewing by the marine vessel operator.

BRIEF DESCRIPTION OF THE DRAWINGS

These and other features of the present invention may be more readily appreciated when considered in the light of the following specification and drawings, in which.

DETAILED DESCRIPTION OF THE PREFERRED EMBODIMENT

Figure 1:
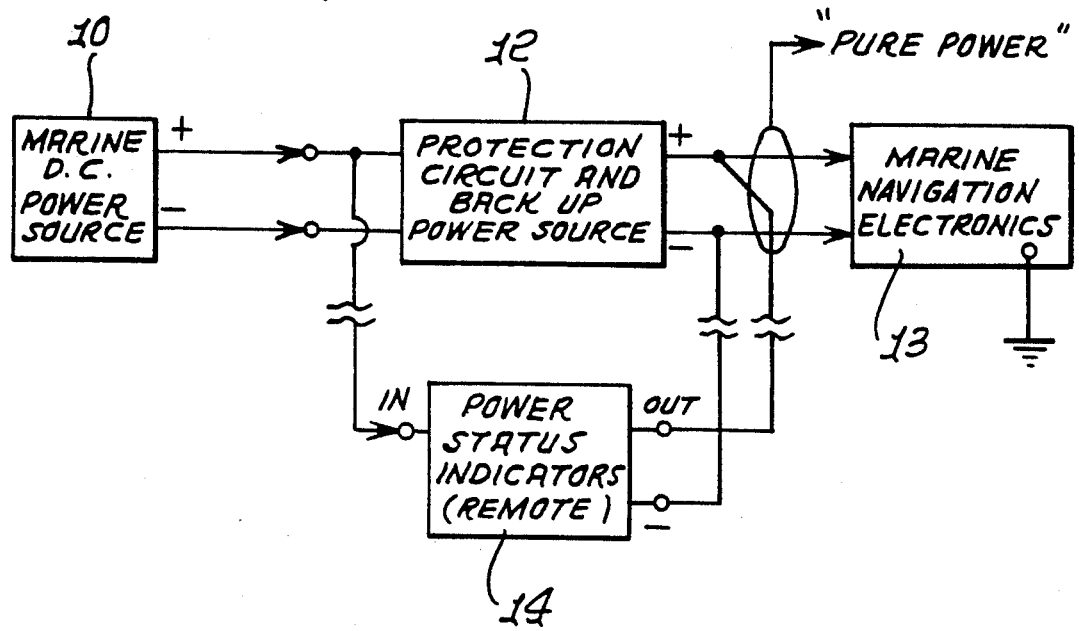
FIG. 1 is a block circuit diagram of the protection circuit and back-up power source package and power status indicator embodying the present invention.

Now referring to the drawings, the method and apparatus of the present invention will be described in detail. The general organization of the protection circuits and back-up power source package is illustrated in FIG. 1 as it may be coupled between the marine D.C. power source 10 and the marine navigation electronics 13. To facilitate the understanding of the present invention, the general nature of the D.C. power source for a marine vessel of conventional construction that provides D.C. power to marine electronic equipment aboard the marine vessel is considered the source 10 of FIG. 1. The D.C. power source 10 exhibits the extraneous signals or "impurities" that are normally associated with such D.C. power buses on a marine vessel. These extraneous signals cause malfunction and component failure of the electronic equipment 13 when they are directly coupled to such a marine power source exhibiting the extraneous signals thereon mentioned hereinabove. The marine power source 10 is such that the power signals may include power surges, reduced voltage outputs, or abrupt voltage changes, as well as noise and transient signals and spikes and the like, all of which are undesirable for proper operation of the electronic equipment aboard a marine vessel or ship. The generation of D.C. power aboard a vessel is by means of an engine for driving a generator, which during periods of engine cranking typically causes drops in output voltages. It is not uncommon for power to be totally lost during the operation of the electronic equipment and thereby resulting in the complete inoperability of the electronic equipment. To avoid the interruptions and undesirable signals on the power generated from the marine source 10, the present invention provides the protective package 12 coupled between the source 10 and marine electronic equipment, such as marine navigation electronic equipment 13. The protection package 12 is coupled to receive power signals directly from the source 10 and to filter out the voltage spikes and audio noises prior to coupling the power signals to the electronic device 13. In this fashion the signals coupled from the output of the protection circuit and back-up power source 12 are considered "pure" power or power signals that have been filtered and voltage spikes removed so as to not adversely affect the operation of the electronic equipment 13. The package 12 also assures continuous operation of the electronics 13 by the provision of a back-up D.C. power source within the package 12 to allow the electronic equipment to be powered without interruption. In the event of a complete power loss or a loss in output voltage from the source 10, the back-up power source will power the marine navigation electronics 13 during the aforementioned conditions.

The present invention also provides a power status indicator 14 that is coupled in parallel circuit relationship with the protection package 12 and for indicating the status of the power signals from the source 10 and also whether the electronics equipment 13 is being powered from the back-up D.C. power source. The power status indicator 14 is shown in block form in FIG. 1 in discontinuous connections to indicate that the power status indicators are preferably arranged at a remote location to be readily visible by the marine vessel operator for signalling the power status so that in the event of loss of power, he can take the necessary corrective action to protect the marine navigational electronics from complete loss of power. The power status indicator signals by means of a flashing light signal during the time intervals when the electronic equipment 13 is being powered by the back-up battery for permitting the vessel operator to take the desired corrective action.

Now referring to FIG. 2, the detailed schematic circuit diagram for the protection package 12 will be described in detail. Protection circuit 12 is illustrated coupled between the positive and negative output terminals from the D.C. power source 10. The positive terminal is identified as the upper input terminal 10U while the negative output terminal is illustrated as the lower input terminal in FIG. 2 and identified as terminal 10L. The protection circuit 12 includes a pair of iron core chokes or inductors 16 and 17 individually connected in series circuit relationship with the positive terminal 10U and the negative terminal 10L, respectively. The opposite ends of the chokes 16 and 17 have a pair of metal oxide varistors connected in parallel thereto, and the varistors are identified as the elements 18 and 19. The varistors are commercially identified as V242A20 units. A coupling capacitor 20 is coupled between the positive and negative terminals, as well. Each of the power lines is also provided with an individual common mode choke illustrated with an iron core and identified as the choke 22 for further reduction of the voltage spikes. The output terminals from the choke 22 have a capacitor 23 coupled in parallel relationship therewith along with a diode 24. The diode 24 of the IN751 type is arraged to block the passage of the power signals across the positive and the negative power lines to prevent short circuiting thereof. A Zener diode 25 and a capacitor 26 are coupled in parallel circuit relationship with a series diode 27 arranged in the positive power lead. The diode 27 has its anode electrode connected to the output side of the choke 22 and its cat hode electrode in common with the cathode electrode for the Zener diode 25 and the positive terminal of the capacitor 26. The diode 27 permits the flow of power therethrough or from the left to the right to the output terminals 12U and 12 for the protective circuit package 12 but prevents voltage flowing backward into the power source. The diode 27 may be of the MBR1645 type and the Zener diode 25 characterized as 1.5 KE, 18 volts capacity. The Zener diode 25 is utilized for clamping the output voltage level to 1.5 kilowatts for up to 1.0 millisecond.

The back-up or standby power source is illustrated in the form of a battery 30 coupled in parallel circuit relationship to the power lines on the opposite side of the capacitor 26 from the Zener diode 25 for direct application to the output terminals 12U and 12L of the package 12. A capacitor 31 is coupled to the opposite side of the battery 30 from the capacitor 26 in parallel circuit relationship therewith. It should be understood that in a practical usage that a suitably proportioned fuse (15 Amps.) is provided in the positive input line adjacent the input terminal 10U for protecting the circuit components in the event of excessive voltage current surges and a similar fuse may also be connected in series with the battery 30. The function of the circuits just described is that the chokes 16 and 17 tend to filter out any voltage spikes or transients and are utilized in conjunction with the shunting varistors 18 and 19. The varistors 18 and 19 may be of a metal oxide construction and exhibit a characteristic causing their resistance to decrease with increases in voltages applied across their terminals, such as voltage spikes, and will cause the voltage spikes to be shunted to the negative power line or to ground. The common mode choke 22 further reduced the voltage spikes along with the capacitors 20 and 23. The Zener diode 25 is utilized to clamp the output voltage level from the marine power source to a maximum limit. It should now be appreciated that with the loss of power from the source 10, the battery 30 will then be directly coupled to the input of the navigation electronics 13 and will continuously power the electronics until the voltage level decreases to a level that would cause malfunction of the electronic equipment 13.

Figure 2:
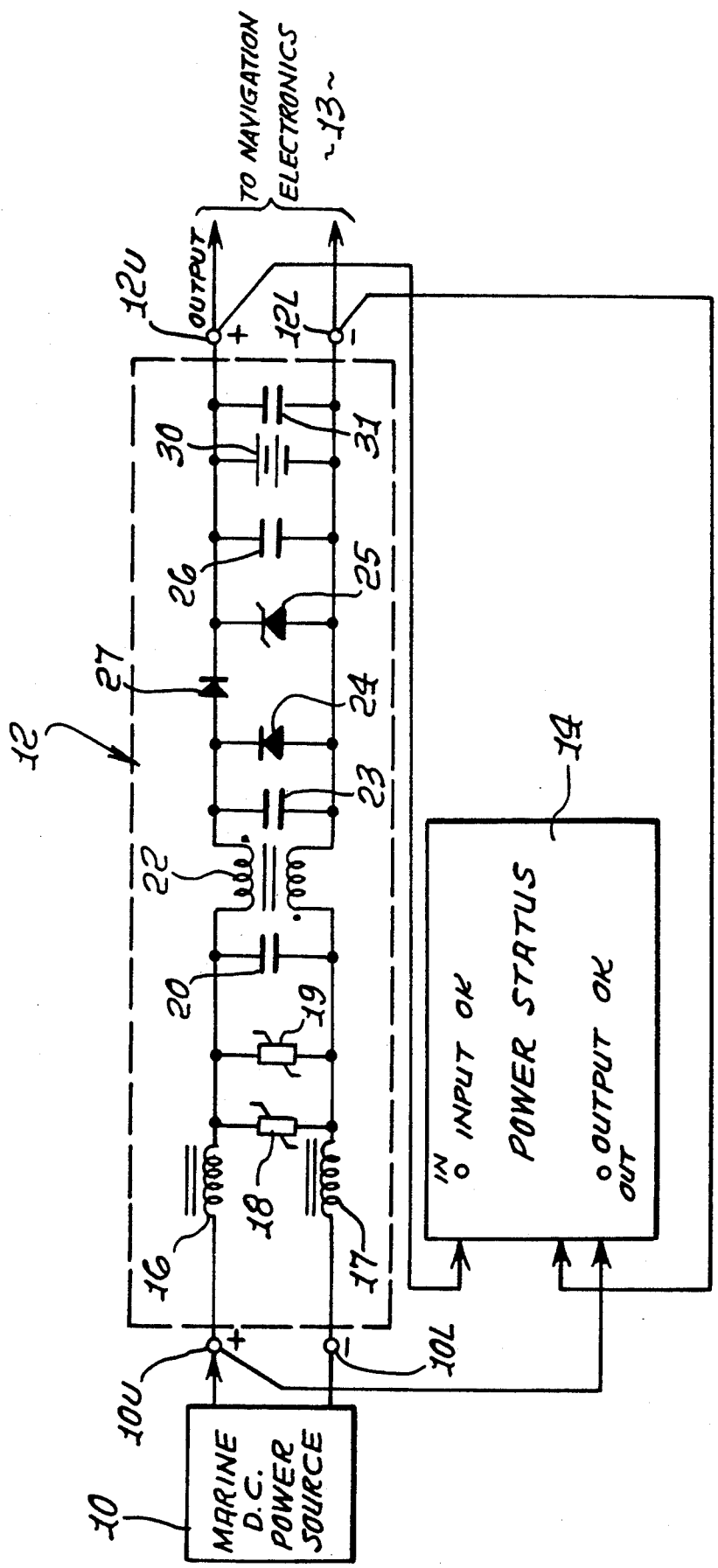
FIG. 2 is a schematic circuit diagram of the protection circuit and back-up power source package and power status indicator illustrated in block form in accordance with FIG. 1.

The power status indicator 14 in FIG. 2 has one input terminal connected directly to the output terminal 10U of the power source 10 and is also directly coupled to the output terminals 12U and 12L from the protection package 12. In this fashion the power status indicator will signal by means of a light signal IN that the input power source is correctly coupled or "O.K." and illuminates an element OUT for signalling that the output power is "O.K." When the D.C. power from the source 10 is correctly coupled through the protective package 12, both the "IN" and the "OUT" signals will be illuminated at the power status indicator 14. The "OUT" signal, as will be described hereinafter, will also function as a blinking light for signalling the vessel operator that the power source 10 has become inoperative and that the navigational electronic equipment 13 is being powered from the battery 30.

Now referring to FIG. 3, the detailed circuit diagram for providing the power status signals IN and OUT will be described. As indicated hereinabove, the input signals to the power status indicator 14 is the signal from the positive input terminal 10U of the power source 10 and the output signals coupled from the output terminals 12U and 12L of the package 12 for providing the power status indicator of the power coupled through the package 12. The IN and OUT indicators will be dark or unilluminated when no power from the source 10 is coupled through the package 12 and illuminated when the power source is operative at the output terminals 12U and 12L. In the event of the loss of power from the source 10, the OUT indicator will flash for signalling the electronic equipment 13 is being powered from the battery 30.

Figure 3:
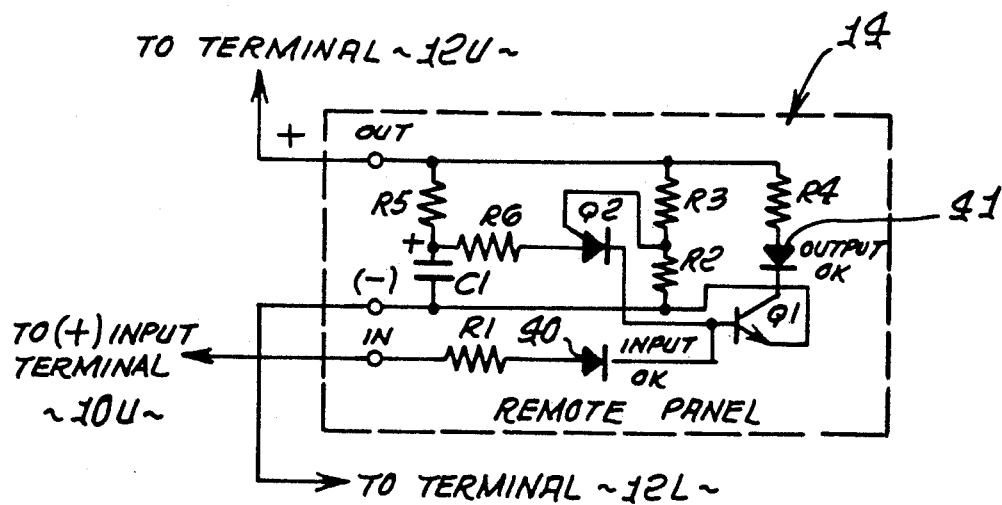
FIG. 3 is a schematic circuit diagram of the power status indicator of FIGS. 1 and 2.

As illustrated in FIG. 3, the input terminal identified as P for the remote panel 14 is coupled directly to the power output terminal 10U. The input terminal P is connected in series circuit relationship with a dropping resistor R1 and a light-emitting diode 40. The diode 40 has its anode electrode connected directly to the output side of the resistor R1 and its cathode electrode connected directly to the base electrode of the transistor Q1. The positive output terminal 12U of the package 12 is connected to the output terminal of the power status indicator 14, identified as the OUT terminal in FIG. 3. The positive OUT terminal is connected directly to the resistor R4 which is connected in series circuit relationship with the light-emitting diode 41. The cathode electrode for the diode 41 is connected to the collector electrode of the transistor Q1. The negative output terminal 12L for the package 12 is connected directly to the negative input terminal of the power status indicator 14 identified as IN in FIG. 3 and is connected directly to the emitter electrode of the transistor Q1. Between the terminals OUT and IN of the indicator 14, in FIG. 3 there is illustrated a parallel resistance capacitor network identified as a resistor R5 and a capacitor C1. A resistor R6 is connected in common with the junction between the resistor R5 and the positive terminal of the capacitor C1 and has its opposite terminal connected to the anode electrode for the unijunction transistor Q2. The cathode terminal for the transistor Q2 is connected directly to the base electrode for the transistor Q1. The gate electrode G for the transistor Q2 is connected in common to the junction between the series network of resistors R2 and R3 which are arranged in series circuit relationship between the IN and OUT terminals. The circuitry operative with the transistor Q2 is arranged to periodically pulse the light-emitting diode 41 during the time intervals the power from the source 10 is last for causing the diode 41 to provide a flashing light signal at the OUT indicator on the power status indicator 14 when the battery 30 is powering the electronic equipment 13. This circuit arrangement is the presently preferred circuit, but it will be appreciated by those skilled in the electronic circuitry art that other electronic pulsing circuits may be satisfactorily employed.

With the circuit component organization of FIG. 3 in mind, it will be noted that the input power at the terminal P from the terminal 10U, when it is operative, will cause a current to flow through the diode 40 emitting a light signal that is visible at the IN indication on panel 14. When the diode 40 is conducting, it will cause the switching of the transistor Q1 from a normally nonconductive state and thereby causing the diode 41 to be energized and to emit a light signal that is visible at the OUT indication of the panel 14. When the power is lost from the source 10, then the signal at the IN terminal for the panel 14 will not be present, or it will be dark as as a result of the de-energization of the diode 40 and the transistor Q1 will be switched back to the nonconductive state so that the light-emitting diode 41 will be in a nonconductive state. This function results from the selection of a transistor of the 2N3568 type for the transistor Q1 in the aforementioned circuit arrangement.

When the power is lost from the source 10, the panel 14 will be powered from the battery 30 and will cause the unijunction transistor Q2 to provide a pulsing output to the light-emitting diode 41. This circuit configuration involving the unijunction transistor Q2 is such that the transistor Q2 will provide a train of pulses such as to cause the transistor Q1 to be rendered conductive along with the light-emitting diode 41 and to provide a flashing light signal at the output "O.K." or OUT position of the panel 14. The transistor Q2 will function in this manner when a 2N6027 unijunction transistor is selected. In this manner the vessel operator will readily see the power status indicator 14 when it is arranged at the remote location from the marine navigation electronics 13 and observe that the IN indicator is dark and the OUT indicator is flashing. This will permit him to take the necessary corrective action for either restoring the D.C. power from the source 10 or to turn off the marine navigation electronics 13 to prevent the malfunction or loss of data, memory and the like in the marine navigation electronics equipment.

In the one practical, operative embodiment of the protective package 12, the desired operation for providing noise filtering and voltage spike protection will now be described. The noise filtering circuits filter out the undersired audio signals through 200 megaHertz. The voltage spike or transient energy protection will provide protection up to 100 joules at 4000 amperes maximum for 8×20 microseconds. All of this may be put in a compact package on the order of 9 inches by 5.9 inches by 4.25 inches having a weight of 7 pounds for a 12 volt D.C. output or a similar package weighing approximately 9.5 pounds for a 24 volt D.C. unit and measuring 13 inches by 5.9 inches by 4.25 inches.

We claim:
1. A protection circuit package for direct current powered, sensitive, marine electronic equipment to be protected and adapted to be coupled between terminals for a marine direct current power source subject to momentary power losses and terminals for said electronic equipment for providing filtered direct current power to said electronic equipment, said protection circuit package housing filtering circuit means having a pair of input terminals adapted to be coupled to the terminals for said marine power source for substantially eliminating voltage spikes, power surges, and noise signals from said marine direct current power source coupled to said filtering circuit means, said filtering circuit means having a pair of output terminals for coupling the filtered marine power to the terminals for said electronic equipment, and a back-up direct current power source coupled between the output terminals of the filtering circuit means for powering said electronic equipment, all aforementioned elements being housed within a single housing to permit the elements to be portably mounted adjacent the electronic equipment to be protected, and a second housing for power status signalling an operative status of the marine direct current power source and the back-up direct current power source, said second housing for the power status signalling having a plurality of input terminals, one of the input terminals being adapted to be coupled to one of the terminals of a preselected polarity of said filtering circuit means, and the other input terminals adapted to be coupled to the output terminals of said filtering circuit means, said second housing comprising circuit means including a pair of light emitting elements connected in series circuit relationship with said one input terminal for said housing and said corresponding polarity output terminal of said filtering circuit means whereby the light emitting elements emit light when said marine power direct current power source is operative and thereby said light elements signal the operative-status thereof, said circuit means including switching circuit means connected between said light emitting elements for energizing and de-energizing one of said light emitting elements in accordance with the availability of power from said marine direct current power source to thereby signal the operative and nonoperative status of the marine direct current power source, and electronic pulse generating circuit means being adapted to be coupled to the input terminals of said power status housing to be powered from said back-up power source upon the loss of power from said marine direct current power source, the loss of said marine power source causing said switching circuit means to be de-energized and thereby said one light emitting element in response thereto while substantially simultaneously activating said pulse generating circuit means for providing actuating pulses to be coupled to said one light emitting element and simultaneously to render said switching circuit means energized for providing a circuit path for pulsing said one light signal to cause a flashing light signal to be emitted therefrom whereby the power status housing signals the loss of said marine power and the fact that said back-up power source is operative, the power status housing being spaced from said protection circuit package and said electronic equipment to be protected to permit said second housing to be mounted in a conspicuous location spaced, a distance from said electronic equipment to be readily viewed for signalling and warning purposes and thereby allow corrective action to be taken by a viewer as to the loss of power from said marine direct current power source prior to the loss of power from said back-up power source to further protect said electronic equipment.

2. A protection circuit package for direct current powered, sensitive, marine electronic equipment to be protected and adapted to be coupled between terminals for a marine direct current power source subject to momentary power losses and terminals for said electronic equipment for providing filtered direct current power to said electronic equipment, said protection circuit package housing filtering circuit means having pairs of input and output terminals with the input terminals adapted to be coupled between the terminals of the marine direct current power source, and a stand-by direct current power source coupled across the output terminals of said filtering circuit means, and a second housing for power status signalling of an operative status of said marine power source and said stand-by power source, said second housing having a plurality of input terminals with one input terminal adapted to be coupled to one terminal of a preselected polarity of said marine power source and the other input terminals adapted to be coupled to the output terminals of said filtering current means to be powered from said stand-by power source, said second housing including a plurality of light emitting means connected in series circuit relationship between said one terminal of the second housing and the other input terminals of said second housing to be coupled to the output terminal of the filtering circuit means to continuously energize said light emitting means with said marine power source when said source is in an operative status, and switching circuit means connected between said light emitting means for controlling a conductivity of one of said light emitting means in accordance with an availability of said marine power source and thereby the conductivity of said switching means, and electronic pulse generating means connected to the input terminals of said power status housing so as to be powered from said standby power source upon a failure of said marine power source, said pulse generating means being characterized as providing a train of pulses coupled to said one of the light emitting means and substantially simultaneously rendering the non-conductive switching means conductive to provide a closed circuit conductive path through said one light emitting means in response to the train of pulses to the output terminal of said filtering circuit means to be coupled to said second housing whereby said one of the light emitting means emits light in response to the train of pulses to thereby provide a flashing, warning signal representative of the powering of the protected electronic equipment by said stand-by power source and the other light emitting means is maintained non-conductive representative of the loss of power from said marine power source.

3. The protection circuit package as defined in claim 1 wherein said pair of light emitting elements comprise light emitting solid state elements.

4. The protection circuit package as defined in claim 2 wherein said plurality of light emitting means comprises light emitting solid state means.

5. The protection circuit package as defined in claims 1 or 2 wherein said filtering circuit means includes electrical clamping means for clamping voltage spikes and electrical transients to a preselected voltage level relative to the marine electronic equipment to be protected.

6. The protection circuit package as defined in claims 1 or 2 wherein said back-up direct current power circuit means comprises battery means.

7. The protection circuit package as defined in claims 1 or 2 wherein said filtering circuit means is constructed of solid state elements.

* * * * *